Patented Feb. 9, 1954

2,668,834

UNITED STATES PATENT OFFICE 2,668,834

O-(2,4,5-TRICHLOROPHENYL) S-(ETHYL-XANTHOYL) DITHIOPHOSPHORIC CHLORIDE

Henry Tolkmith, Midland, Mich., assignor to The Dow Chemical Company, Midland, Mich., a corporation of Delaware No Drawing. Application April 21, 1953,
Serial No. 350,247

1 Claim. (Cl. 260—455)

The present invention is directed to O-(2,4,5-trichlorophenyl) S-(ethylxanthoyl) dithiophosphoric chloride of the formula

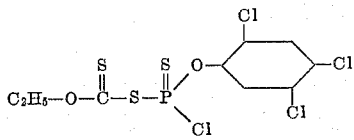

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting an alkali metal ethylxanthate with O-(2,4,5-trichlorophenyl) thiophosphoric dichloride of the formula

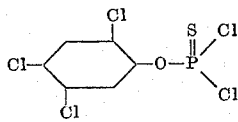

in an inert organic solvent such as benzene or chloroform. Of the alkali metal xanthates found useful in the reaction, it is preferred to employ the sodium compound. Good results are obtained when substantially equimolecular proportions of the reactants are employed.

In carrying out the reaction, the sodium ethylxanthate is added with stirring to the O-(2,4,5-trichlorophenyl) thiophosphoric dichloride dispersed in the solvent and the resulting mixture heated for a period of time at a temperature of from 35° to 80° C. If desired, the reaction may be carried out in the presence of a small amount of a tertiary-amine such as triethyl amine as reaction catalyst. Temperatures substantially in excess of 80° C. for any appreciable period of time should not be employed as the desired product has a tendency to decompose at such temperature. Upon completion of the reaction, the mixture may be filtered and the filtrate distilled under reduced pressure at gradually increasing temperatures to separate low boiling constituents and to obtain as a residue the desired O-(2,4,5-trichlorophenyl) S-(ethylxanthoyl) dithiophosphoric chloride.

The O-(2,4,5-trichlorophenyl) thiophosphoric dichloride employed as a starting material in the above-described method may be prepared by reacting one molecular proportion of sodium 2,4,5-trichlorophenolate with at least one molecular proportion of phosphorus thiochloride (PSCl₃) in an inert organic solvent such as benzene. In carrying out the reaction the sodium 2,4,5-trichlorophenolate is added portionwise with stirring to the phosphorus thiochloride and the resulting mixture thereafter heated for a period of time at a temperature of from 30° to 70° C. to complete the reaction. The reaction is somewhat exothermic and takes place smoothly at the temperature range of from 30° to 80° C. The temperature may be controlled by regulation of the rate of contacting the reactants as well as by the addition and subtraction of heat, if required. Upon completion of the reaction, the mixture may be filtered and the filtrate fractionally distilled under reduced pressure to obtain the desired O-(2,4,5-trichlorophenyl) thiophosphoric dichloride.

The latter is a viscous oil having a density of 1.6653 at 20° C. and a refractive index n/D of 1.6084 at 20° C.

In a representative preparation, 48 grams (0.33 mole) of sodium ethylxanthate was added with stirring to 100 grams (0.303 mole) of O-(2,4,5-trichlorophenyl) thiophosphoric dichloride and 3 grams of triethyl amine dispersed in 250 milliliters of chloroform and the resulting mixture heated for 6 hours at a temperature of 50° C. At the end of this period, the reaction vessel and contents were cooled to room temperature and the reaction mixture filtered. The filtrate was then washed with water and thereafter concentrated by distillation under reduced pressure to a temperature up to 45° C. to obtain as a residue an O-(2,4,5-trichlorophenyl) S-ethylxanthoyl) dithiophosphoric chloride product. The latter is a viscous oil having a density of 1.5004 at 20° C. and a refractive index n/D of 1.5922 at 20° C.

The new O-(2,4,5-trichlorophenyl) S-ethylxanthoyl) dithiophosphoric chloride product is effective as a parasiticide and adapted to be employed for the control of a wide range of agricultural and household pests such as flies, mites, aphides, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil in water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches 100 percent kills of these pests are obtained with dust compositions containing 4.5 percent by weight of the toxic dithiophosphoric chloride.

This is a continuation in part of my copending application Serial No. 203,781, filed December 30, 1950.

I claim:

O-(2,4,5 - trichlorophenyl) S-(ethylxanthoyl) dithiophosphoric chloride.

HENRY TOLKMITH.

No references cited.